United States Patent [19]

Abiven

[11] Patent Number: 5,526,346

[45] Date of Patent: Jun. 11, 1996

[54] TREE STRUCTURED STAR TELECOMMUNICATION SYSTEM INCLUDING MULTIRATE FRAMES

[75] Inventor: Jacques Abiven, Plouaret, France

[73] Assignee: France Telecom, Paris, France

[21] Appl. No.: 304,230

[22] Filed: Sep. 12, 1994

[30] Foreign Application Priority Data

Sep. 15, 1993 [FR] France ................................. 93 11079

[51] Int. Cl.$^6$ ................................................ H04J 14/02
[52] U.S. Cl. ............................ 370/30; 370/31; 370/84; 370/99; 370/112; 359/114; 359/124
[58] Field of Search ........................ 370/84, 99, 112, 370/79, 30, 31; 359/114, 123, 124

[56] References Cited

U.S. PATENT DOCUMENTS

| | | | |
|---|---|---|---|
| 4,631,720 | 12/1986 | Koeck | 370/99 |
| 4,893,306 | 1/1990 | Chao et al. | 370/84 |
| 5,005,170 | 4/1991 | Nelson | 370/84 |
| 5,119,223 | 6/1992 | Panzer et al. | 359/123 |
| 5,363,370 | 11/1994 | Abiven | 370/84 |

FOREIGN PATENT DOCUMENTS

| | | |
|---|---|---|
| 485260 | 5/1992 | European Pat. Off. |
| 2636482 | 11/1993 | France |

Primary Examiner—Douglas W. Olms
Assistant Examiner—Min Jung
Attorney, Agent, or Firm—Laubscher & Laubscher

[57] ABSTRACT

A tree-structured star telecommunication network of the wavelength division multiplex transmission type includes multirate periodic downstream and upstream frames transmitted at different wavelengths in full-duplex mode, thereby to connect a central terminal with a plurality of user terminals. Half-duplex transmission for each low bit rate terminal equipment uses a half-frame period shift with respect to the frame period between upstream frame data sectors and downstream frame data sectors. Data derive by the high rate equipment is transmitted in upstream and downstream sectors not occupied by low bit rate data.

9 Claims, 3 Drawing Sheets

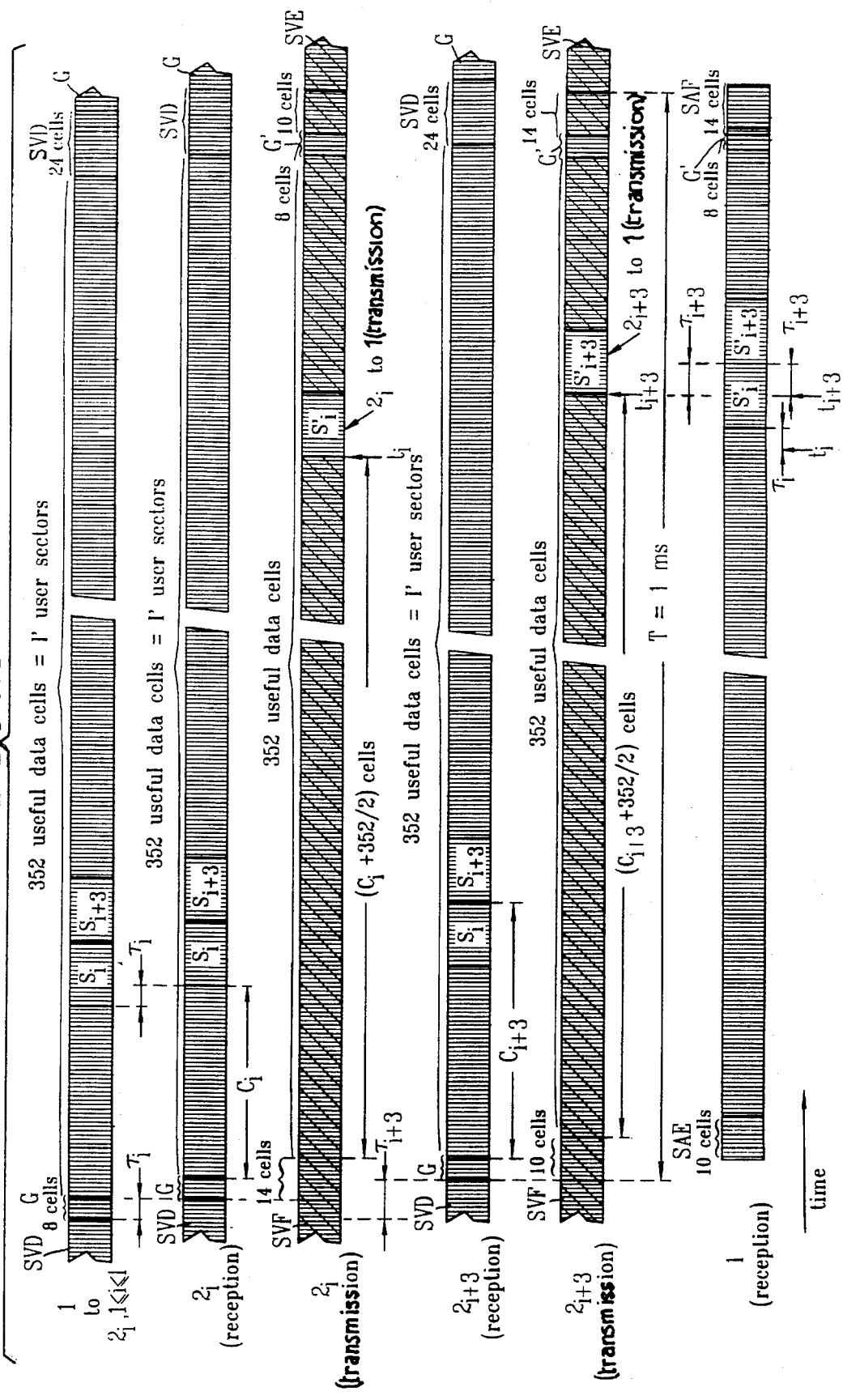

TREE STRUCTURED STAR TELECOMMUNICATION SYSTEM INCLUDING MULTIRATE FRAMES

BACKGROUND OF THE INVENTION

1—Field of the Invention

The present invention is generally concerned with time division multiple access and time division multiplexing in telecommunication networks. The invention is more particularly concerned with multirate frame structures, also known as multispeed frame structures, for tree-structured star telecommunication networks, especially fiber optic networks.

2—Description of the Prior Art

As described in U.S. Pat. No. 5,363,370 by the inventor, a multirate frame is defined as a frame obtained by time division multiplexing of or time division multiple access to data having line bit rates, i.e., bit rates in one transmission medium, that are different; accordingly, a time interval, such as a frame time cell, having a constant duration can be allocated to a number of bits different from that allocated to another time interval according to the bit rates of the sources from which the bits originate. A multirate frame of this kind differs from a conventional frame produced by time division multiplexing of data at different bit rates, by increasing these different bit rates into a same line bit rate.

In prior art shared optic fiber networks there are two main modes of transmission between two equipments, namely half-duplex mode, also called as a two-way alternate transmission, and full-duplex mode, also called as a two-way simultaneous transmission, which results from wavelength division multiplexing.

In half-duplex mode the transmission direction alternates. While one equipment is sending data the other equipment is receiving the data, and vice versa. In each equipment there are a send phase and a receive phase that do not overlap. For a predetermined data bit rate D between the two equipments the line bit rate is equal to at least 2 D, given the alternating time sharing of the transmission medium between the two equipments. In practise a propagation time and an interference suppressing guard time increase the line bit rate to a value substantially equal to 2.5 D.

In wavelength division multiplexing full-duplex transmission, each of two equipments connected to respective ends of an optical fiber sends to the other equipment using a respective wavelength in the optical fiber.

Each of these two transmission modes has its own advantages and disadvantages.

Half-duplex mode is particularly well suited to low bit rate data transmission. The doubling of the line bit rate does not impose any bit rate limitations on either the equipments or the transmission medium, and this technique can be implemented using reversible send/receive components which are not costly. In particular, a single diode can be used to send and receive by reversing the bias thereof. A diode of this kind has a range of operating frequencies enabling it to be used to send and receive at respective different frequencies.

Wavelength division multiplexing full-duplex mode is the only efficient transmission technique for high bit rate data. It uses costly optical duplexers to simultaneously enable reception at a first wavelength and transmission at a second wavelength.

OBJECT OF THE INVENTION

The main object of this invention is to provide a frame structure for tree-structured star telecommunication network using wavelength division multiplexing mode in which a periodic downstream frame derived by a central equipment and addressed to a plurality of terminal equipments and an upstream frame comprising groups of user cells derived respectively by terminal equipment and addressed to the central equipment are transmitted at two respective different wavelengths in full-duplex mode, half-duplex transmission mode being used for each low bit rate terminal equipment for two user data cell groups of upstream and downstream frames respectively sent by said each low bit rate terminal equipment and addressed to said each low bit rate terminal equipment. When possible, full-duplex transmission is used for the high bit rate terminal equipment.

SUMMARY OF THE INVENTION

Accordingly, multirate periodic downstream and upstream frames are transmitted in full-duplex mode on a tree-structured bidirectional line respectively at a first wavelength from a central equipment to a plurality of terminal equipments and at a second wavelength different from the first wavelength from the plurality of terminal equipments to the central equipment. The terminal equipment receive and transmit data cells having a constant duration with respective line bit rates different therebetween. In the downstream and upstream frames, a useful data field is reserved for consecutive time cells in a predetermined number which are intended to be occupied by data cells respectively received and transmitted by terminal equipment being communicated with the central equipment. Each data cell in the useful data field is located by a rank, i.e., a numerical position. According to the invention, first data cells in the downstream frame which are received by a communicating terminal equipment and which have given ranks in the useful data field correspond with first data cells in the upstream frame transmitted by said communicating terminal equipment which have ranks in the useful data field respectively equal to first sums of a predetermined integer at least equal to 1 and the given ranks modulo the predetermined number of time cells in the useful data field.

In practise, respective groups of first data cells are assigned in the frames to communicating terminal equipments, and the predetermined integer is substantially equal to half the predetermined number of time cells in the useful data field.

On the other hand, for high bit rate terminations transmitting and receiving second data cells, full-duplex transmission is used wherever possible. To this end, second data cells in the upstream frame are associated with second data cells received by a terminal equipment in the downstream frame and are transmitted by said terminal equipment in free first time cells of the useful data field not occupied by first data cells.

Given the bursty nature of ATM communications and to avoid systematic recourse to a management sector provided in the downstream frame, at least a second downstream frame data cell contains the rank of a first time cell not occupied in the upstream frame to be transmitted to the terminal equipment.

In a preferred embodiment of the invention the terminal equipment bit rates are 192 kbit/s, N×2 048 kbit/s where N is a interger more than 1, and 155.520 Mbit/s. The duration of each time cell coincides with 64 octets at the line bit rate of 196.608 Mbit/s associated with the terminal equipment data bit rate of 155.520 Mbit/s. A cell therefore contains an ATM packet of 53 octets.

BRIEF DESCRIPTION OF THE DRAWINGS

The foregoing and other objects, features and advantages of the invention will be apparent from the following detailed description of several embodiments of the invention with reference to the corresponding accompanying drawings in which:

FIG. 2 are timing diagrams for upstream and downstream frames transmitted between a line terminal and network terminations in the FIG. 1 distribution network.

DESCRIPTION OF THE PREFERRED EMBODIMENTS

Figure 1:
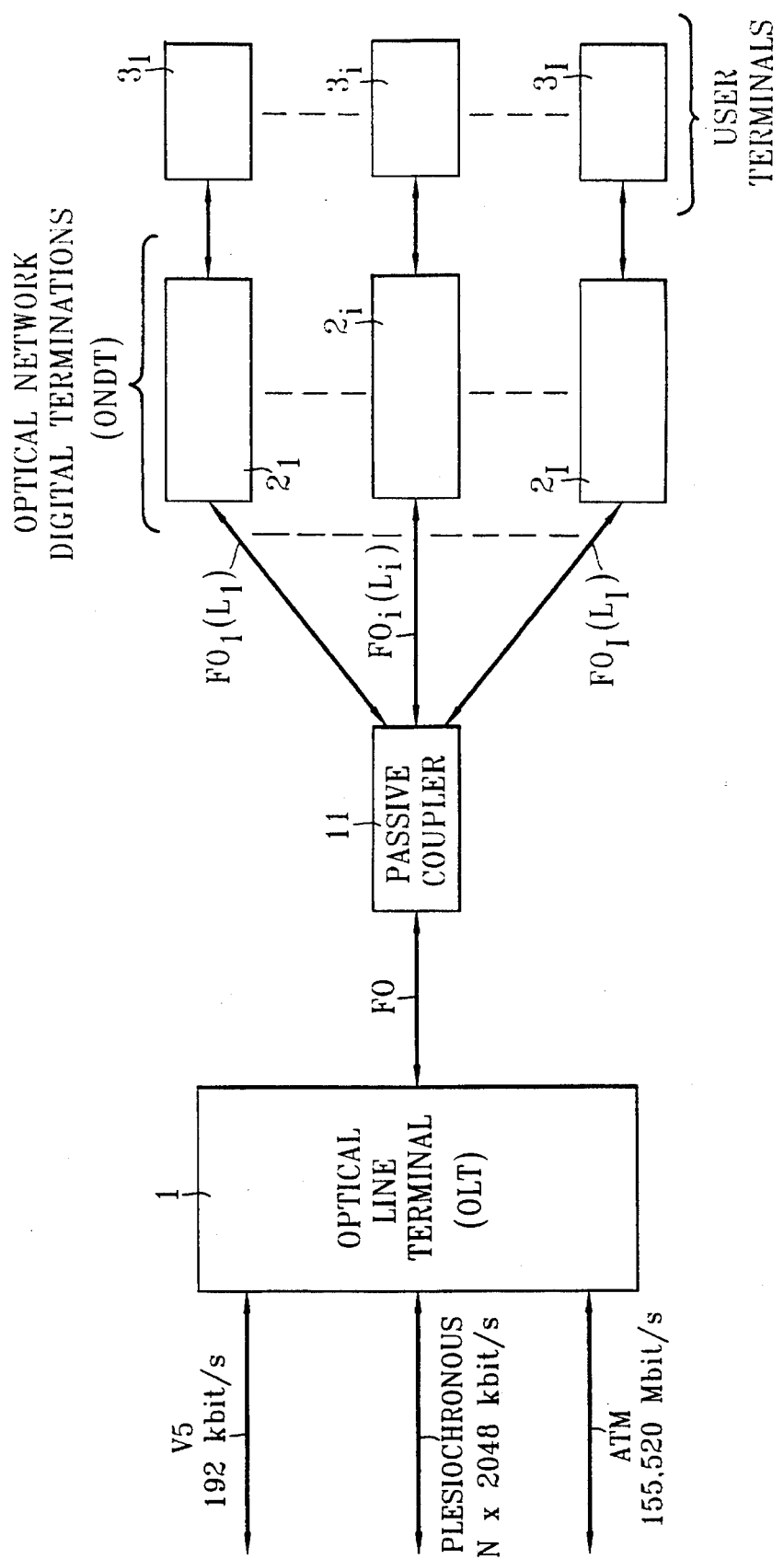
FIG. 1 is a schematic block diagram of a fiber optic tree-structured distribution network according to the prior art.

Referring to FIG. 1, a central equipment and terminal pieces of equipment in a fiber optic star distribution network contributing to the formation of frames in accordance with the invention typically comprise an optical line terminal (OLT) 1 and I optical network digital terminations (ONDT) $2_1$ through $2_I$. Three input/output ports of the terminal 1 are respectively connected to links of different kinds and bit rates, for example such as an ATM (Asynchronous Terminal Mode) asynchronous link with a bit rate of 155,520 Mbit/s, a plesiochronous link with a bit rate of N×2 048 kbit/s, N being a positive integer, a link as defined in CCITT Recommendation V.5 for basic rate access to the ISDN (Integrated Services Digital Network) at 192 kbit/s or also an analog link. A passive optical coupler 11 or a plurality of optical couplers (not shown) distributed along a tree-structured bidirectional transmission line couples the terminal 1 to the I digital terminations $2_1$ through $2_I$ which are respectively connected to I user terminals $3_1$ through $3_I$.

Three inputs of the optical line terminal 1 respectively receive data at the ATM high bit rate, at the plesiochronous bit rate and at the low bit rate according to the Recommendation V.5. The terminal 1 groups the data from each link into data cells of predetermined duration and multiplexes the data in groups of cells. The cells have different line bit rates which coexist in the downstream frames transmitted to the digital terminations $2_1$ through $2_I$. The optical coupler 11 has a first port connected to the optical line terminal 1 by an optical fiber FO and I second ports respectively connected to the I digital terminations $2_1$ through $2_I$ by I optical fibers $FO_1$ through $FO_I$. The downstream frames produced by the line terminal 1 are routed to each of the digital terminations $2_1$ to $2_I$ through the coupler 11 and via the I optical fibers.

Note that the following description does not cover synchronization problems relating to the formation of upstream frames received by the line terminal 1 from respective cell groups transmitted by the digital terminations (users) $2_1$ through $2_I$. The method used for this synchronization can be that described in French patent No. 2,636,482, for example. This method caters for the disparity in propagation times of data between the various digital terminations $2_1$ through $2_I$ and the line terminal 1, given that the optical fibers between the digital terminations $2_1$ through $2_I$ and the passive coupler 11 have different respective lengths $L_1$ through $L_I$. Respective correction time-delays are applied to the data transmitted in the digital terminations $2_1$ through $2_I$ according to the respective optical fiber lengths $L_1$ through $L_I$ so that upstream frames of contiguous user cell groups are formed at the coupler 11 by time division multiple access, overlapping between cells transmitted by two different digital terminations and unwanted no-data gaps between two consecutive cells being avoided.

The first and third lines in FIG. 2 respectively show a downstream frame transmitted from the line terminal 1 to the digital terminations $2_1$ through $2_I$ and a user sector $S'_i$ comprising a group of elementary data cells transmitted from a digital termination $2_i$ to the line terminal 1. The downstream frames transmitted from the line terminal 1 to the digital terminations $2_i$ through $2_I$, and the upstream frames formed in the coupler 11 and resulting from time division multiplex access to user cell groups with different bit rates transmitted by I' communicating user terminals among the I user terminals $3_1$ through $3_I$, I' being an integer less than I, have a period T of 1 ms and comprises 384 data cells. Downstream and upstream frames are transmitted simultaneously by multiplexing different first and second wavelengths. The downstream frames are transmitted at the first wavelength from the line terminal 1 to the digital terminations $2_1$ through $2_I$, and the user sectors such as the sector $S'_i$ shown in the third line of FIG. 2 modulate the second wavelength in I' communicating digital terminations for transmission to the line terminal 1.

Each downstream frame comprises in succession a management sector G with eight data cells, a useful data field reserved for 352 cells divided between at most I' user sectors, called cell groups, respectively, addressed to I' terminals among the I terminals $3_1$ through $3_I$, and a sector containing no data SVD and having a length of 24 cells. Each upstream frame, such as that shown in the sixth line of FIG. 2, is delimited by a header alignment sector SAE and an end-of-frame alignment sector SAF which enclose a useful data field of 352 time cells including I' user cell sectors transmitted to the line terminal 1 from respective communicating user terminals and a eight-cell management sector G'. The header and end-of-frame alignment sectors SAE and SAF respectively comprise 10 and 14 elementary data cells.

In accordance with the invention, asynchronous data at the ATM high bit rate of 155.520 Mbit/s coexist in the upstream and downstream frames with synchronous service data whose bit rates are, for example, bit rates of the N×2 048 kbit/s plesiochronous hierarchy. The assigning of a bit rate to a user terminal $3_i$ results from the allocation of a given number time cells of the upstream and downstream frame to data cells sent and received by this terminal. To each communicating user terminal is assigned one or more cells in each frame according to the bit rate of the terminal. Although FIG. 2 shows user sectors, such as the sectors $S_i$ and $S_{i+3}$ in the downstream frame and the sectors $S'_i$ and $S'_{i+3}$ in the upstream frame, formed from consecutive cells in the frame, user cells can be formed from non-consecutive cells in the frame.

There are two constraints to be met in defining the time cell size. Firstly, to facilitate send and receive synchronization of the digital terminations with the data cells in the time cells allocated to them, it is necessary that the time window or time slot defining a time cell coincides with an integer number of bits and that a cell start time must coincide with a bit start phase, regardless of the bit rate and even though the ATM bit rate of 155.520 Mbit/s is not a multiple of the plesiochronous hierarchy and basic access low bit rates. Moreover, since the asynchronous transfer mode (ATM) is characterized by an information transfer unit, called packet, comprising (53×8) bits at 155.520 Mbit/s, i.e. 53 octets at 19.440 Moctet/s, each time cell must have a duration such that it comprises at least 53×8 bits at 155.520 Mbit/s.

Two approaches are proposed to meeting these two constraints, subject to the condition that the line bit rates in the upstream and downstream frames respectively associated with the ATM, plesiochronous and basic access bit rates are multiples of a common factor so that each frame time cell is limited to a time interval coinciding with an integer number of bits, regardless of the line bit rate. This condition leads to choosing line data send and receive clocks in the digital terminations $2_1$ through $2_I$ and the line terminal 1 with respective frequencies greater than or if necessary equal to the frequencies of the data produced by the user terminals $3_1$ through $3_J$, to avoid the need for excessively high capacity buffer memories in the terminations $2_1$ through $2_I$ and the line terminal 1 for compensating differences between the line bit rates and the associated data bit rates.

Figure 3A:
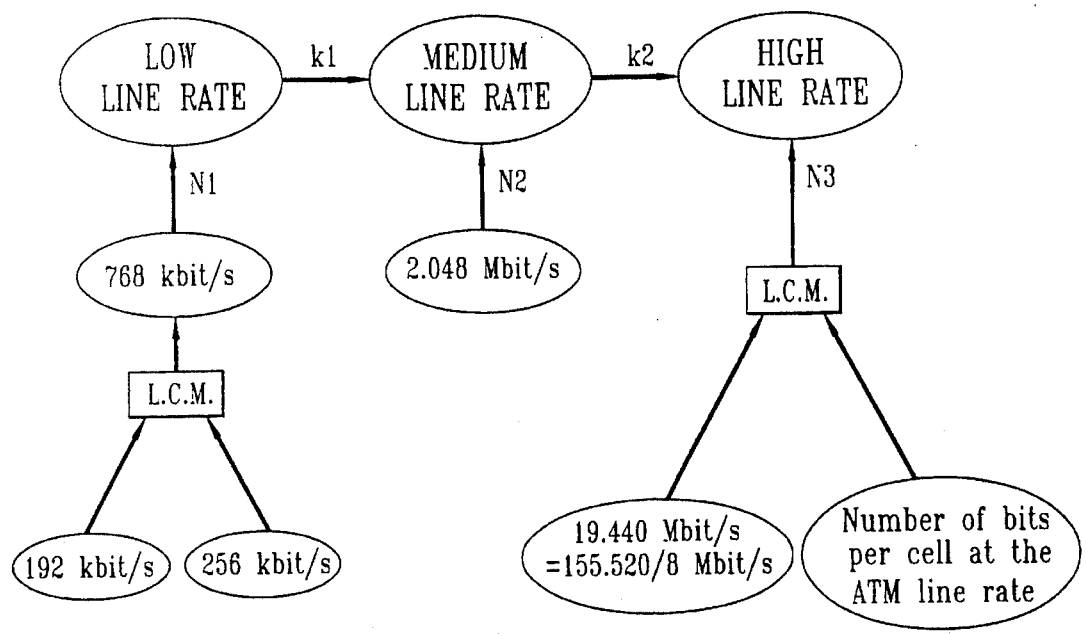
FIGS. 3A and 3B are respective diagrams of two frequency plans for the line data bit rates of the FIG. 2 frames.

The first approach, shown diagrammatically in FIG. 3A, is directed to satisfying the following requirements:

(a) The line bit rates are multiples of one of them, as shown by the integer coefficients $k_1$ and $k_2$.

(b) The line bit rates are multiples of the associated data bit rates, or multiples of a lowest common multiple L.C.M. of a set of data bit rates, such as the line bit rate of 768 Mbit/s for the data bit rates of 192Mbit/s and 256 Mbit/s, as indicated by the integer coefficients N1, N2 and N3. This requirement facilitates implementation of each of the line data receive and send clocks in the digital terminations and the line terminal by combining a frequency multiplier with a clock routinely employed at a frequency corresponding to a data bit rate, which avoids the use of custom or highly specialized components which are inevitably more costly.

(c) The high line bit rate associated with the ATM data rate is firstly, as mentioned under head (b), a multiple of the ATM bit rate and, secondly, an integer multiple of the number of bits per elementary data cell, which bits are at the line bit rate associated with the ATM data bit rate. The first point as aforementioned results from the consideration referred to under head (b) above concerning the cost of clocks at the line bit rate frequencies, and the second point ensures an integer number of elementary cells per frame. The upstream and downstream frames have a period equal to 1 ms and the line bit rate associated with the ATM data bit rate is written in the form $d_{atm}$ kbit/s, i.e. $d_{atm}$ bit/ms, and thus the number of bits per frame at the line bit rate associated with the ATM bit rate is equal to $d_{atm}$. If this number $dat_m$ is a multiple of the number of bits per elementary cell at the line bit rate associated with the ATM bit rate, there is an integer number of cells in the frame. This second point ensures continuity of synchronization from one frame to the next.

Figure 3B:
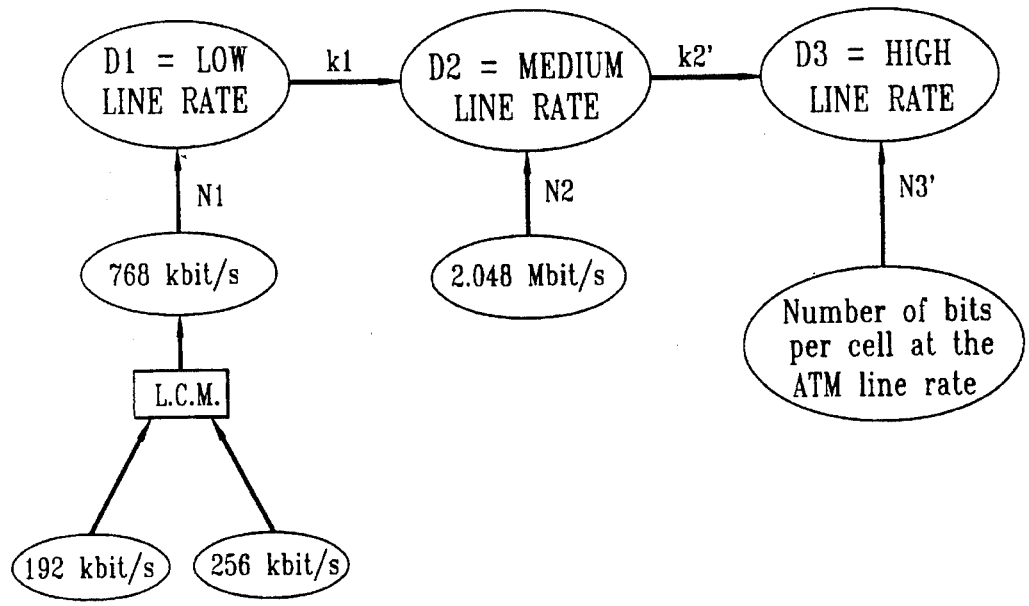

The second approach, shown diagrammatically in FIG. 3B, is directed to meeting requirements (a) and (b) as stated above and also the following requirement:

(c') The high line bit rate associated with the ATM bit rate is only a multiple of the number of bits per elementary data cell, which bits are at the line bit rate associated with the ATM data bit rate, and this high bit rate is not an integer multiple of the ATM bit rate.

The second approach, dispensing with the requirement for a high line bit rate which is a multiple of the ATM bit rate, and therefore differing from the first approach, implies a higher cost of clock components for sending and receiving ATM line data.

In practise, the feasibility of the first approach is problematical at present, as the ATM line data send and receive clock frequencies can be too high. Each approach is further based on the fact that each elementary data cell must contain, at the line bit rate associated with the ATM bit rate, a number of bits substantially greater than or equal to the number of bits in a standard ATM packet, i.e. (8×53) bits, so that a cell contains an ATM packet.

For example, there is proposed for the first approach (FIG. 3A) an elementary cell with (60×8) bits at the high line bit rate associated with the ATM bit rate. The lowest common multiple L.C.M. of 60×8 and 155520 is equal to 311040. The minimal line bit rate associated with the ATM bit rate must therefore be equal to 311040 kbit/s. As shown by the integer coefficients N2, N3 and k2 in FIG. 3A, this first approach must satisfy the condition:

2048×N2×k2=311040 i.e., $2^{11}$×N2×k2=($2^8$×3×55)×N3 i.e., $2^3$×N2×k2=($3^5$×5)×N3.

Comparing the various numbers and coefficients on each side of the last equation above, N3 is at least equal to $2^3$. The high line bit rate associated with the ATM bit rate must therefore be at least equal to $2^3$×311 L.C.M. of 60×8 and 155520 is equal to 311040 kbit/s=2488320 kbit/s. This latter high bit rate value is difficult to achieve. However, this first approach can be adopted for asynchronous services at bit rates lower than the standard ATM bit rate of 155.520 Mbit/s.

Only the second approach (FIG. 3B) provides more acceptable solutions for a number of bits per elementary cell at the line bit rate associated with the ATM bit rate equal to or substantially greater than 53×8 bits, by sacrificing a high line bit rate associated with the ATM bit rate which is a multiple of the ATM bit rate, and therefore using lower cost clocks to send and receive data on the line.

The optimal solution is achieved for (648×8) bits per elementary cell at the high line bit rate associated with the ATM bit rate. Referring to FIG. 3B, this solution yields the following equations eq1 and eq2:

$$768 \times N1 \times k1 = 2048 \times N2 \qquad \text{(eq 1)}$$

$$2048 \times N2 \times k2' = 64 \times 8 \times N3' \qquad \text{(eq 2)}$$

that is:

$$3 \times 2^8 \times N1 \times k1 = 2^{11} \times N2$$

$$2^{11} \times N2 \times k2' = 2^9 \times N3'$$

that is:

$$3 \times N1 \times k1 = 2^3 \times N2$$

$$2^2 \times N2 \times k2' = N3'$$

The following frequency results are deduced from the two equations simplified as above, given that the line high bit rate associated with the ATM bit rate must be greater than or equal to the ATM bit rate:

N3'=384 k2'=8 k1=8

N2=12

N1=4

The line bit rates D1, D2 and D3 respectively associated with the data bit rates 768 kbit/s, 2,048 Mbit/s and 155.520 Mbit/s therefore assume the following values:

D1=3.072 Mbit/s

D2=24.576 Mbit/s

D3=196.608 Mbit/s

Each elementary data cell in an upstream or downstream frame can contain 64×8 bits at the line bit rate D3=196,608 Mbit/s, or 64 bits at the line bit rate D2=24,576 Mbit/s, or eight bits at the line bit rate D1=3.072 Mbit/s.

Referring again to FIG. 2, the structures of the upstream and downstream frames transmitted between the digital terminations $2_1$ through $2_I$ and the line terminal 1 are now described in more detail. There are two types of termination: on the one hand, high bit rate terminations typically operating at the ATM bit rate or at high bit rates in the plesiochronous hierarchy and using optical duplexers, and on the other hand, low bit rate terminations operating, for example, at the low bit rates of the plesiochronous hierarchy or at the ISDN basic rate access bit rate and using reversible optical components.

The first and last lines of FIG. 2 respectively show a downstream frame transmitted from the line terminal 1 to each of the digital terminations $2_1$ through $2_I$ and an upstream frame. The management sectors G' and G each of eight cells in the upstream and downstream frames are respectively intended for first management words for requesting assignment of elementary data cells by the digital terminations $2_1$ and $2_I$ and second management words for assigning elementary cells to these requesting terminations, the second words being transmitted by the line terminal 1. The first and second management words have respective line bit rates associated with the data bit rates of the user terminals $3_1$ through $3_J$ so that they can be sent, received and interpreted directly by the terminations $2_1$ through $2_I$ without requiring further synchronization means. Three subsectors at the line bit rates D1, D2 and D3 respectively associated with the low, medium and high data bit rates of the terminals $3_1$ through $3_J$ are therefore defined in the management sectors G and G'. Each of these subsectors is addressed in turn to each of the terminations being communicated at the bit rate concerned. The management sectors G and G' further contain synchronization words respective to the various line bit rates and used for periodic synchronization of the terminations and the line terminal.

The downstream frame also contains 352 useful data cells forming I' user sectors, such as the sectors $S_i$ and $S_{i+3}$ respectively for the low bit rate terminations $2_i$ and $2i+_3$.

As shown in the second and fourth lines of FIG. 2, the downstream frame shown in the first line is received with respective time-delays $\tau_i$ and $\tau_{i+3}$ by the two low bit rate terminations $2_i$ and $2i+_3$ to which the sectors $S_i$ and $S_{i+3}$ are respectively addressed. The time-delays $T_i$ and $T_{i+3}$ depend on the lengths $L_i$ and $L_{i+3}$ of the respective optical fibers connecting the line terminal 1 and the low bit rate digital terminations $2_i$ and $2_{i+3}$.

The digital terminations $2_1$ through $2_I$ are periodically synchronized at the frame frequency with synchronization words respective to the various line bit rates provided in the management sector G. Because the first and second management words are preliminary transmitted in the management sectors G and G', respective sectors of elementary cells are assigned to the I' communicating terminations among the I terminations $2_1$ through $2_I$. A user sector constituting a group of cells is assigned to a given termination by the line terminal 1 introducing the numerical ranks of these cells in the frame, into respective management words of management sectors G. The synchronization words for the various bit rates transmitted in the management sector G enable synchronization of the various terminations to the frame and thus formation of respective time windows coincident with the time cells containing the data cells respectively addressed to them.

The third and fifth lines in FIG. 2 show two user sectors $S'_i$ and $S'_{i+3}$ respectively transmitted from the low bit rate terminations $2_i$ and $2_{i+3}$ to the line terminal 1 and intended to form part of an upstream frame shown in the sixth line of FIG. 2. The sectors $S'_i$ and $S'_{i+3}$ are shown inserted into a frame only for purposes of explanation; only the sectors $S'_i$ and $S'_{i+3}$ are actually formed and transmitted by the respective low bit rate terminations $2_i$ and $2_{i+3}$. The parts shaded with oblique lines in the frames shown in the third and fifth lines of FIG. 2 correspond to transmission dead times in the respective low bit rate terminations $2_i$ and $2_{i+3}$.

Each termination $2_1$ through $2_I$ is resynchronized in each frame period. In the example shown in the third line, respectively fifth line of FIG. 2, the low bit rate termination $2_i$, respectively $2_{i+3}$ produces, in response to the time at which reception of the downstream frame starts, each cell of a sector $S'_i$, respectively $S'_{i+3}$ of an upstream frame after the sum of the following first and second time-delays:

(1)—The first time-delay is equal to the product of the duration of a cell by a sum of a first numerical rank $C_i$, respectively $C_{i+3}$ of a cell which is associated with said each cell of an upstream frame sector and which is received in the useful data field of the downstream frame in the sector $S_i$, respectively $S_{i+3}$, and a second numerical rank, in this instance 352/2, of a median cell in the useful data field. Each upstream frame cell has an associated cell in a downstream frame since the assignment of a bit rate to a termination is characterized by the assignment of equal numbers of cells in successive upstream and downstream frames.

(2)—The second time-delay is the sum of a guard time and a correction time-delay. The correction time-delay is calculated by the method defined in French patent No. 2,636,482 and depends on the length $L_i$, $L_{i+3}$ of the optical fiber $FO_i$, respectively $FO_{i+3}$ connecting the line terminal 1 to the low bit rate termination $2_i$, respectively $2_{i+3}$. The guard time is constant in all the terminations $2_i$ through $2_I$ and is equal to the duration of at least eight consecutive cells included in the management sector G or G' so that the terminations and the terminal 1 do not transmit during reception of a management sector. This guard time would in any event be necessary to change from the receive mode to the send mode relative to a sector in a low bit rate termination operating in half-duplex mode, if transmission of a sector in an upstream frame was not deferred by 352/2 cells relative to reception of the same rank sector in the downstream frame. The correction time-delays compensate for propagation time differences proportional to the lengths of the optical fibers $FO_1$ through $FO_I$ so that the sectors sent by the communicating terminations constitute the upstream frame at the coupler 11 without time overlapping. The greater the distance between the termination and the coupler 11, the smaller the correction time-delay. Because the upstream frame and the downstream frame contain 24 empty cells in the SVD, SAE and SAF sectors, the correction time-delay can be at most equal to 24−8=16 cells for the termination nearest the coupler 11. Referring to the third line in FIG. 2, for example, a correction time-delay of 14−8=6 cells is imposed in the low bit rate termination $2_i$. Referring to the fifth line in FIG. 2, a correction time-delay of 10−8=2 cells is imposed in the termination $2_{i+3}$ which is farther from the coupler 11 than the termination $2_i$.

With reference to the upstream frame shown in the sixth line of FIG. 2, by virtue of the definition of the first time-delay, each cell of a sector $S'_i$ transmitted from the low bit rate termination $2_i$ to the line terminal 1 has a rank in the useful data field of the upstream frame equal to the modulo-352 sum of a) the rank $C_i$ of a cell associated with each cell and transmitted by the line terminal 1 in the sector $S_i$ to the termination $2_i$ and b) the rank 352/2=176 of the median cell in the useful data field. Thus the first useful field cell in the downstream frame corresponds to the 177th useful field cell in the upstream frame and the 177th and 352nd cells in the downstream frame correspond to the first and the 176th cells of the upstream frame.

Full-duplex transmission using this rank between upstream frame cells and associated downstream frame cells for the low bit rate terminals, on the one hand, ensures that the low bit rate terminations transmit and receive in half-duplex mode using reversible optical components, given that data cells are not transmitted and received simultaneously by one and the same digital termination $2_i$, and on the other hand, ensures that high bit rate terminations transmit and receive data cells simultaneously using optical duplexers. In accordance with the invention, high bit rate terminations are assigned upstream and downstream frame cells which are not occupied by data cells sent and received by the low bit rate terminations. For these high bit rate terminations the rank of an upstream frame cell associated with a downstream frame cell does not systematically correspond to the rank of said downstream frame cell added to the rank of the median cell of the useful data field, i.e. 352/2. The first free cell or sector in the upstream frame is assigned to the high data bit rate digital termination to which a downstream frame cell or sector is addressed. Depending on the occupation of upstream frame time cells and downstream frame time cells having respective ranks equal to the sums of the ranks of said upstream frame cells and the rank of a median frame of the useful data field by data cells sent and received by low bit rate terminations, simultaneous sending and receiving are possible in a high bit rate termination, in particular if the upstream and downstream frames contain little data sent and received by low bit rate terminations. Note that to a time cell or a group of time cells not occupied by low bit rate data in the downstream frame corresponds a cell or a group of cells not occupied by low bit rate data in the upstream frame and having a location which is necessarily offset by one half-period of the useful data field relative to that in the downstream frame. If a high bit rate data cell or cell group is to be transmitted by a high bit rate termination, the line terminal 1 looks for a first available cell or cell group in the upstream frame in order to assign it to the high bit rate digital termination by transmitting the rank(s) of the cell(s) concerned in binary code in the downstream frame.

Concerning the aforementioned feature, the prior art, as described in the French patent No. 2,636,482 and U.S. Pat. No. 5,363,370, merely guarantees half-duplex transmission by proposing that a downstream frame including user sectors be transmitted from the line terminal 1 to the terminations $2_1$ through $2_I$ and that, following reception by all the terminations $2_1$ through $2_I$ of all of the downstream frame, respective user sectors are transmitted by the communicating terminals $2_1$ through $2_I$ to the line terminal 1 to form an upstream frame. Thus the prior art technique is not optimized relative to high bit rate transmission since a termination cannot send and receive simultaneously.

To prevent any overlapping of cells transmitted by and addressed to the same low bit rate digital termination, the number of cells assigned to a low bit rate digital termination is at most equal to half the number of cells in the useful data field. This limitation on the number of cells assigned to the same low bit rate digital termination prevents any simultaneous sending and receiving of cells by this digital termination because of the rank difference between cells of the upstream frame cells and associated downstream frame cells.

In an embodiment of the invention intended in particular to cater for the bursty nature of asynchronous transmission at the ATM bit rate, the (64−53)×8 bit locations not used by an ATM packet in each downstream frame cell and therefore empty of useful data, in the example of a (64×8)-bit cell at the line high bit rate specified above, are filled by the line terminal 1 with a rank in binary code to be assigned to an upstream frame cell associated with each cell. This solution avoids systematic use of the management sector G for each packet of an ATM burst and is accordingly directed to meeting asynchronous transfer mode real time operating constraints.

What I claim is:

1. A tree-structured star telecommunication network operable in a full-duplex bidirectional mode, comprising:

(a) line terminal means (1) having a plurality of inputs connected with sources of data having given data bit rates, respectively, said line terminal means having an output;

(b) a plurality of user terminal means ($3_1$, $3_i$, $3_I$);

(c) reversible central coupler means (11) connecting said line terminal output with said user terminal means, respectively;

(d) said line terminal means generating multirate periodic downstream frames having a first wavelength that are addressed to each of said user terminal means, and said user terminal means generating upstream frames having a second wavelength that are addressed to said line terminal means;

(e) said user terminal means having different line bit rates, respectively, and being operable to receive and transmit data cells having a constant cell duration;

(f) each of said downstream and upstream frames having a useful data field including a predetermined number of consecutive time cells operable for occupation by data cells received and transmitted by said user terminal means, each data field in said useful data field being located by a given rank;

(g) at least one first data cell in said downstream frame which is received by a user terminal means and which has a given rank in said downstream frame useful data field corresponding with a first data cell in said upstream frame which is transmitted by said one user terminal means and which has a determined rank in said upstream frame useful data field, each of said determined ranks being equal, respectively, to a first sum with respect to said predetermined number of consecutive time cells in said useful data field, said first sum resulting from the addition to said given ranks of a predetermined integer at least equal to 1, respectively.

2. Apparatus as defined in claim 1, wherein said predetermined integer is generally equal to one-half of said predetermined number of time cells in said useful data field.

3. Apparatus as defined in claim 1, wherein second data cells in said upstream frame are associated with second data cells received by a user terminal means in said downstream field, said second data cells being transmitted by said user terminal means into free ones of said first consecutive time cells of said useful data field that are not occupied by said first data cells.

4. Apparatus as defined in claim 3, wherein said first and second data cells received and transmitted by said user terminal means are consecutively combined in at least one group in said downstream frame and in at least one group in said upstream frame, respectively.

5. Apparatus as defined in claim 4, wherein at least one data cell in said second downstream frame contains the rank of a first said time cell not occupied in said upstream frame to be transmitted to said user terminal means.

6. Apparatus as defined in claim 1, wherein time cells are assigned to said user terminal means according to the line bit rate of said user terminal means which is at least equal to the data bit rate in said user terminal means.

7. Apparatus as defined in claim 1, wherein each said first data cell in said upstream frame from an associated user terminal means is transmitted with a time-delay relative to a receive start time of said downstream frame in said associated user terminal means, said time-delay being equal to the sum of first and second time-delays, said first time delay being the product of the respective said first sum by said cell deviation, and said second time-delay being at least one correction time-delay dependent on a length of said line between said associated user terminal means of said line terminal means.

8. Apparatus as defined in claim 1, wherein said line bit rates are multiples of a common factor, and further wherein each time cell has a duration which coincides with an integer number of bits regardless of said line bit rates.

9. Apparatus as defined in claim 1, wherein said data bit rates are 192 kbit/s, N×2 048 kbit/s where N is an integer more than 1, and 155.520 Mkit/s, and the duration of each time cell coincides with 64 octets at the line bit rate of 196.608 kbit/s associated with a user terminal means data bit rate of 155.520 Mbit/s.

* * * * *